Clarence W. Brandon
INVENTOR.

Oct. 31, 1961 C. W. BRANDON 3,006,154
METHOD FOR REFRIGERATION AND HEAT TRANSFER
Filed March 4, 1955 3 Sheets-Sheet 2
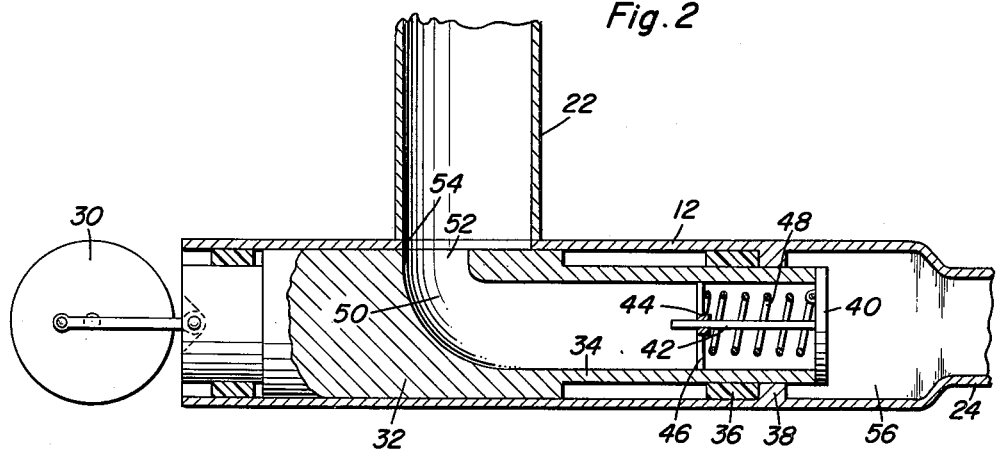
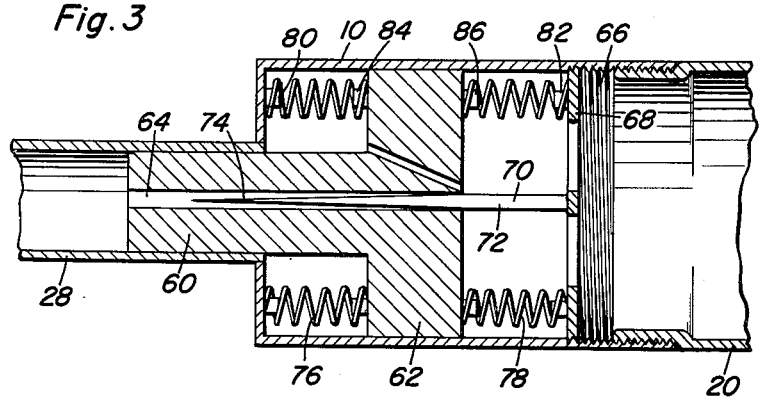
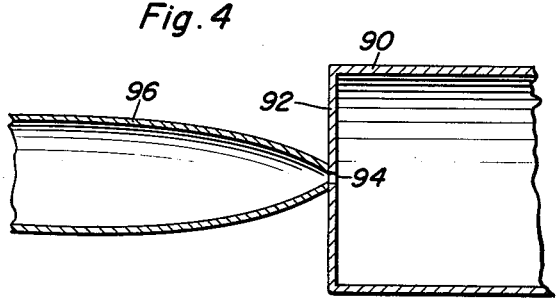
Clarence W. Brandon
INVENTOR.

United States Patent Office 3,006,154
Patented Oct. 31, 1961

3,006,154
METHOD FOR REFRIGERATION AND HEAT TRANSFER
Clarence W. Brandon, 1806 S. Meridian, Tallahassee, Fla., assignor of twelve and one-half percent to Orpha B. Brandon, Birmingham, Ala., five percent to Harvey B. Jacobson, Washington, D.C., and fifty percent to N. A. Hardin, Catherine H. Newton, and Hazel H. Wright, all of Forsyth, Ga.
Filed Mar. 4, 1955, Ser. No. 492,211
16 Claims. (Cl. 62—115)

This invention comprises novel and useful improvements in a method and apparatus for refrigeration and heat transfer and more particularly relates to increasing the efficiency of heat transfer in a refrigerating system of the circulatory type by the application of a sonic energy carrying wave thereto.

The principal object of this invention is to provide a refrigerating method and an apparatus for increasing the removal of heat from one location and its transfer to and release from a second location, through the use of sonic vibrations of predetermined characteristics applied to the refrigerant.

Another important object of this invention is to increase the efficiency of the refrigerating system by the maintenance of standing waves of sonic characteristics in the evaporator and/or the condenser thereof to facilitate the transfer of heat therein.

A further very important object of the invention is to effect or assist in maintaining, by the application of sonic vibrations thereto, the condensing portion of the refrigerant of a circulating refrigerating system in a substantially liquid phase and to maintain the evaporator portion of the refrigerant in a substantially vapor phase.

Another important object is to provide in conjunction with the above mentioned objects a method and apparatus whereby energy may be introduced into the refrigerating system principally to maintain sonic vibrations in the system for effecting and/or facilitating the transfer of heat into and from the system.

An extremely important object in conjunction with the aforementioned objects is to utilize the eduction of liquid into the evaporator and/or the conducting of the vapor into the condenser for the augmenting and/or assisting in maintaining a sonic standing wave in the system.

Another important object is to provide a refrigerating method and means to cause the cyclic transfer of heat of compression of the vapor into the condensing liquid, so that at least a portion of the heat is transmitted and reflected throughout the condenser at sonic velocity.

A still further object is to provide a refrigerating method and a means for causing cyclic absorption of heat from the evaporator, so that at least a portion of the absorption means for heat is transmitted into and propagated as a wave at sonic velocity throughout the evaporator.

Another important object of the invention is to provide a more efficient refrigerating method permitting a reduction in the size of a refrigerating system.

Yet another important object of the invention is to provide an apparatus and method in accordance with the foregoing objects wherein a means for causing circulation of refrigerant uni-directionally throughout the system may be also employed to produce and maintain a standing wave of a sonic nature in the refrigerant for improving the efficiency of heat exchange of the system.

An additional important object of this invention is to provide a method and apparatus whereby a plurality of sonic waves may be individually produced and combined in the condenser portion of a refrigerating system to produce a temperature and pressure rise therein by their mutual cancellation and to dissipate the heat evolved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged view in vertical section through the pump forming a part of the circulatory system;

FIGURE 3 is an enlarged view in vertical section through a portion of the expansion valve of the refrigerating system;

FIGURE 4 is a view similar to FIGURE 3 but is a modified form of fluid expansion means which may be employed in the system.

This invention relates to a method and apparatus for refrigeration and heat transfer and particularly pertains to the withdrawal of heat from a colder zone and subsequently disposing of the heat in a warmer zone, being especially applicable to those refrigerating systems in which a uni-directional circulation of refrigerant throughout the system is employed.

This invention is a continuation in part of my prior co-pending applications Serial No. 296,038, now Patent No. 2,866,509; and Serial No. 431,246.

It is known in the refrigeration art that "wet compression" facilitates the transfer of heat from the compression of the heat laden vapor into the condensing medium. Various means have been employed to effect this "wet compression" including cycling of a portion of the liquid refrigerant from the bottom of the condenser and allowing it to mingle with the vapor during the compression cycle. In the present invention, use is made of sonic vibrations of predetermined characteristics in the form of a standing wave to further the advantages of "wet compression" and to facilitate the change of phase between the vapor and the liquid state of the refrigerant in the condenser and/or the evaporator of the circulating refrigerating system. Through the facilitation of the change of phase of the refrigerant, heat exchange between the evaporator or the condenser and the surrounding heat exchanging medium is greatly facilitated thereby contributing to the increased efficiency of the refrigerating system.

Figure 1:
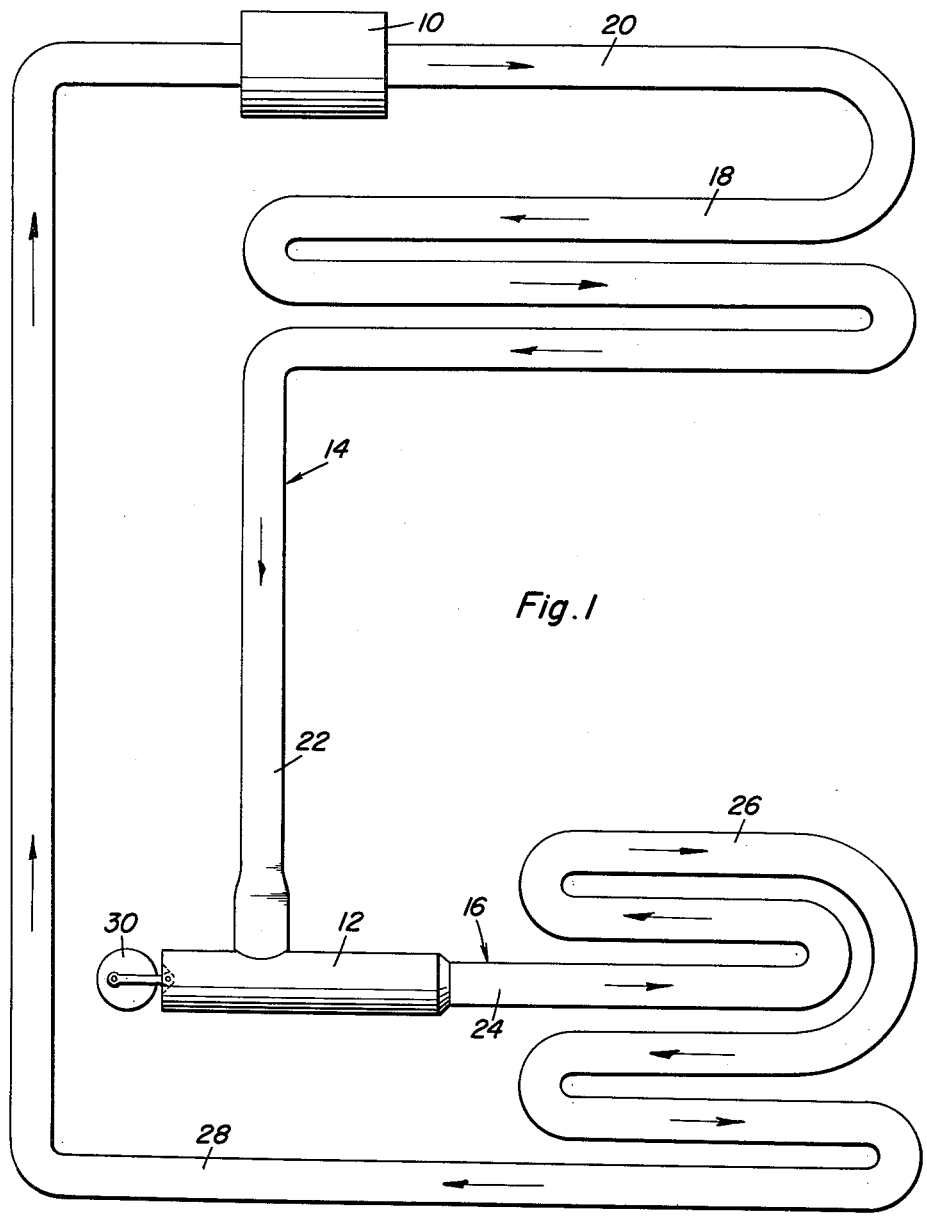
FIGURE 1 is a diagrammatic view illustrating in its simplest form the application of the principles of this invention to a conventional refrigerating system of the circulatory type.

*Embodiment of FIGURES 1–3*

In FIGURE 1 there is diagrammatically illustrated a refrigerating system of the circulatory type to which the principles of this invention may be easily applied and which system includes an expansion valve 10, a refrigerant circulating pump 12, an evaporator unit indicated generally by the numeral 14 and a condenser unit indicated generally by the numeral 16. The evaporator unit is considered to extend from the expansion valve 10 to the intake side of the circulating pump 12, while the condenser unit is understood to extend from the discharge side of the circulating pump 12 to the expansion valve 10. In the refrigerating system illustrated, the refrigerant is understood to have a uni-directional circulation as indicated by the arrows in FIGURE 1.

The evaporator unit 14 consists of a set of evaporating coils 18 which are understood to be in good heat exchange relation with a heating medium from which heat is to be removed for cooling the medium, as for example, the interior of a refrigerating device. The evaporating coils 18 of the evaporator are connected as by a conduit 20 with the expansion valve 10 and by a further conduit 22 with the intake side of the refrigerant circulating pump 12, it being understood that the coils 18 together with the conduits 20 and 22 comprise the evaporator unit 14.

The condenser unit 16 likewise includes a conduit 24 which receives the refrigerant discharged by the circulating pump 12 and by means of which the refrigerant is delivered to the condensing coil 26 which likewise is in heat exchange relation with a surrounding medium, the latter being a cooling medium by means of which heat may be discharged from the condensing coil 26. The latter is also connected as by a conduit 28 with the inlet side of the expansion valve 10, the conduits 24 and 28 together with the condenser coil 26 comprising the condenser unit 16.

It is to be understood that the pump 12 may be operated from any suitable source as by means of a crank shaft 30.

Attention is next directed to FIGURE 2 for an explanation of the refrigerant pump 12 employed with this invention.

As will be seen in FIGURE 2, the pump 12 includes a cylindrical body in which is slidably received a piston 32 which is connected with the crank shaft 30 for reciprocation thereby. This piston includes a hollow cylindrical extension 34 at its forward end which extends through a sealing or packing ring 36 disposed against an annular rib or flange 38 upon the interior of the cylinder. The outer end of the cylindrical extension 34 constitutes a valve seat which is closed by a poppet valve 40 having a valve stem 42 rigidly extending therefrom, this stem being slidably and guidingly received in a guide bushing 44 carried by a spider 46 mounted upon the internal wall of the extension 34. A tension spring 48 is attached to the poppet valve 40 and to the spider 46 for yieldingly retaining the poppet valve 40 closed upon the seat formed upon the extremity of the cylindrical extension 34.

The main portion of the piston 32 is provided with a passage 50 which terminates in an induction port 52 communicating with the port 54 formed in the wall of the pump barrel 12 and with which the end of the conduit 22 communicates. The proportions and dispositions of the ports 52 and 54 are such that the port 52 remains continuously in free communication with the port 54 during the entire stroke of the piston 32 during its reciprocation by the crank shaft 30.

As so far described it will be seen that upon reciprocation of the piston 32, the refrigerant in its vapor phase from the evaporator 14 will be inducted through the conduit 22 and the continuously registering ports 54 and 52, into the interior of the hollow piston and during the reversal of motion of the piston at the outer end of its stroke, will pass the valve 40 and enter the pump chamber 56 to the right of the valve and thus will enter the conduit 24 forming a part of the condenser unit 16. It will thus be apparent that uni-directional step-by-step movement will be imparted to the refrigerant by the piston whereby the same will be drawn in from the evaporator and propelled into the condenser unit. In accordance with conventional practice in refrigerating systems of this general type, it is understood that the compression of the refrigerant during its transfer by the piston from the evaporator to the condenser will tend to convert the refrigerant from its vapor to its liquid phase, this conversion being of course facilitated by the dissipation of heat from the coils 26 of the condenser into the surrounding, cooling medium.

Under the pressure of the pump unit 12, the refrigerant is propelled from the condenser coils 26 by means of the conduit 28 to the expansion valve 10, from whence the liquid refrigerant is discharged into the evaporating unit and thus by its expansion and conversion from the liquid to the vapor phase is employed to absorb heat from the medium surrounding the evaporator coils 18 and thus cool such medium.

Reference is made to FIGURE 3 for a description of the particular expansion valve assembly 10 which is employed in the system illustrated. The end of the conduit 28 communicates with the diametrically enlarged member in the valve assembly 10. A piston 60 is slidable and is guided in the extremity of the conduit 28 and has a diametrically enlarged head 62 which is slidable and is guided in the enlarged chamber of the casing of the valve assembly 10. An axial bore 64 extends through the piston 60 and its enlarged head 62 for a purpose to be subsequently set forth. The opposite end of the casing of the expansion valve assembly 10 from that which communicates with the conduit 28 is internally threaded as at 66 and is detachably engaged by the conduit 20 forming a part of the evaporator unit 14, and also screw-threadedly receives the ring 68 constituting a spider which supports the axially extending metering pin valve 70. The latter has a base portion 72 adjacent the spider which is preferably of uniform diameter, and a tapering extremity or needle 74 which is received within the bore 64. Although the valve 70 may be adjustable by manipulating its supporting spider ring 68 in the threaded portion 66 of the casing of the evaporator valve 10, it may be generally considered to be a stationary needle valve which cooperates with the bore 64 of uniform cross sectional area to thereby adjustably restrict or throttle flow through the same as the piston and its head 60 and 62 are reciprocated within the conduit 28 and the casing of the evaporator valve 10.

Sets of compression springs 76 and 78 engage the opposite sides of the piston head 62 for yieldingly maintaining the piston members 60 and 62 in what may be termed a normal, intermediate portion, these springs cooperating with spring retaining projections 80 and 82 on an end wall of the casing of the evaporator valve assembly 10 and the spider 68 respectively, and retaining projections or pins 84 and 86 on opposite sides of the enlarged head 62.

It will now be understood that the axial position of the piston members 60, 62 with respect to the needle valve 70 will determine the effective area of the opening of the bore 64 and consequently the rate of flow of fluid through the same from the conduit 28 towards and into the evaporator unit conduit 20. It will be understood that the base portion 72 of the needle valve may be such as to substantially stop all flow through the bore 64 when the head 62 is moved a suitable distance towards the right as viewed in FIGURE 3, while when the head 62 is moved to its left a sufficient distance, the effective area of the bore 64 will be progressively increased as the progressively tapering needle portion 74 of the valve 70 is positioned within the end of the bore.

Under the pulsating pressures of the liquid refrigerant delivered by the conduit 28 against the valve 60, the valve members 60 and 62 will be reciprocated and thus will vary the area of the opening of the bore 64 and/or the time of such opening. These pulsations, which produce the reciprocating motion of the valve members 60 and 62, consist of fluid pulsations produced in the refrigerant by the circulating pump 12 and/or a sonic energy carrying wave produced in the refrigerant in a manner to be subsequently set forth.

In the refrigerating system as so far described, the condensing unit is maintained substantially filled with the refrigerant in its liquid phase from the circulating pump 12 to the expansion valve 10, while the evaporator unit 14 receives the refrigerant in its vapor phase from the expansion valve 10 to the intake of the refrigerant pump 12. I have found that the efficiency of heat exchange of a system of this character may be increased by creating and maintaining an energy carrying sonic wave, preferably in the form of a standing wave, in the condenser unit, or in the evaporator unit, or both. Although the specific action of a sonic standing wave in the units of refrigerating systems are not fully understood, it is believed that a two-fold result is produced thereby. First, it is thought that the agitation in the refrigerant in either the condenser or the evaporator or both, serves to increase the facility and effectiveness of the vapor and liquid phase contacts therein and thus promote the transition of the refrigerant between its vapor and liquid phases. Such increase in the facility of the change of phase apparently results in a proportionate change in the rate of heat exchange between the refrigerant and the medium having heat exchange relation therewith. Secondly, it is believed that the momentary increases or decreases in the temperature and pressure of the refrigerant in the condensing unit or the evaporator unit or both temporarily increases the outflow of heat from the condenser unit into the surrounding cooling medium; and the inflow of heat from the surrounding heating medium into the evaporator coils.

In any event, it has been found that the use of the sonic wave vibration definitely increases the efficiency of the heat exchange relationship in the refrigerating system.

In order to obtain a standing wave in the condenser unit or the evaporator or both, it is necessary that a sonic wave be generated in the refrigerating medium in each of those units. For that purpose, the wave length of the standing wave must be such that the standing wave is at a one-quarter phase relation at the piston 40 of the circulating pump 12 and also at a one-quarter phase where it engages the piston 60 at the end of conduit 28 in the expansion valve assembly 10. Similarly, the standing wave set up in the evaporator unit 14 must be at a one-quarter phase relation with respect to the adjacent face of a piston head 62 of the expansion valve assembly 10 and also at a one-quarter phase relation with respect to the inlet port 52 of the piston 32.

It is of course possible that two separate sonic standing waves may be set up, one in each of the two units; or alternatively, a single standing wave may be produced in the entire system consisting of the evaporator unit, the condenser unit, the expansion valve assembly and the circulating pump.

It is within the scope of this invention to use any desired means for creating and maintaining the aforesaid sonic standing waves. However, I find it to be particularly advantageous to employ the reciprocating piston of the circulating pump 12 as a means for generating a sonic standing wave in the condenser unit 16, and from the latter, at the expansion valve assembly 10, create and maintain a standing sonic wave in the evaporator unit 14.

A very satisfactory method of generating a sonic wave for the purposes of this invention is by means of a reciprocating type of wave generator such as that which is disclosed and illustrated in detail and claimed per se in my prior copending application Serial No. 296,038. For a detailed explanation of the operation of such a generator reference is made to FIGURES 3–11 in said last mentioned copending application. Briefly, however, the manner in which the piston 32 of the present invention is utilized both as a pump for causing a unidirectional step-by-step circulation of the refrigerant throughout the system, and also to produce and maintain a standing wave in the condenser unit of this system is as follows:

It is assumed that the condenser unit 16 of this system is filled with the refrigerant in its liquid phase. It is known that all liquids are, to a slight extent at least, compressible; and that by rapidly reciprocating a piston into a pipe of considerable length filled with a liquid or condensed fluid, due to the slight compressibility of the liquid, the energy of the reciprocating piston is converted into a sonic wave in the liquid within the pipe which is propagated toward the end of the pipe at sonic velocity. Further, as set forth in my last mentioned above-identified copending application, I have found that by proper acceleration of the piston in a conduit completely filled with a liquid or condensed fluid of considerable density, that a zone of considerable rarefaction can be produced adjacent the head of the piston when the latter slows down at the end of its outstroke into the conduit and as the piston begins to accelerate from its outward position upon its return stroke. If the proper piston speed is obtained, a rarefied zone of considerable volume can be created adjacent the piston in this condition by what may be termed "a running away" of the dense particles of the fluid, owing to the inertia of the liquid set in motion by the piston, the volume of the rarefied zone considerably exceeding the travel displacement of the piston. I have found, by tests, that where the peaks of pressure of the sonic wave outwardly exceeded several hundred pounds, that I could cyclically cause a zone of at least ten inches of vacuum of mercury in the considerably rarefied zone created adjacent the piston.

Under the conditions above mentioned, I have further found that a vapor can be intermittently introduced into the rarefied zone during this period of rarefied pressure, and that if the acceleration rate of the piston outwardly and inwardly were sufficiently coordinated, that the dense fluid outwardly thrown by the piston could be properly timed and caused to rebound against the piston as the latter slowed down upon its backward or return stroke. It has been further found that the rebounding fluid from the substantially stationary piston at the inward or return end of its stroke could be so coordinated that upon the following outstroke of the piston additional energy could be imparted to the outgoing energy wave as the latter rebounded and was reflected from the substantially stationary piston as above mentioned, and that the vapor introduced into the rarefied zone could be impressed into the rebounding fluid within which the sonic wave was being generated. Thus, the additional energy imparted into the wave by this "augmenting" effect of the properly timed rebounding wave could be employed to effect substantially immediate condensation of the vapor applied into the rarefied zone. If the pipe containing the liquid were of sufficient length in relation to the frequency in a generator wave, a standing wave of a sonic character could be generated in the fluid within the pipe and be maintained therein.

It has been further found that even in using water as an absorptive fluid and introducing carbon dioxide in its vapor phase into the wave, that the fluid would heat rapidly outwardly from the piston and that at an elevated part of the pipe outwardly from the piston, the pipe would become heated to a degree unbearable to the touch. In explanation of this observed transfer of heat, it was found that the pressure or condensation peaks of the sonic wave were encouraged, it being well known in the art of sonic vibration that when heat is communicated periodically at the moment of greatest condensation of a sonic wave, the sonic wave is encouraged. Also, some of the heat of the introduced vapor was communicated to the liquid in which the wave was propagated, this being observed by the warming of the pipe and its contents outwardly from the piston.

In the use of refrigerants of sufficient density and elasticity such as the Freons, although this invention is not limited thereto, the induction of the vapor and its impression into the condensed portion of the Freons is readily achieved in transfer of heat from the vapor upon its inclusion into the condensed refrigerant and its elevation of temperature, for extraction of heat from the condensed refrigerant into the surrounding condensing medium surrounding the condenser, is facilitated.

It will thus be understood that by operating the reciprocating piston 32 at the proper frequency with regard to the length of the condenser unit, that a standing wave may be set up and maintained in that condenser, in order to increase the rate of heat emission from the condenser into the surrounding cooling medium therefor.

In order to establish and maintain a sonic wave in the evaporator, by using the circulating pump of the system as the wave generator, it is necessary to allow a portion of the sonic wave produced by the generator in the condensing unit to periodically enter the evaporator. It has long been known in the sonic art that the intensity of a sound wave being received at a distance depends on the density of the medium at the point where the sonic wave is generated, and not upon a continuing density of the material in which the sonic wave was generated or propagated.

Accordingly, when the standing wave generated within the condenser unit 16 reaches the piston 60, the vibration of the latter by the wave generator, and/or escape of a portion of the energy of the wave through the bore 64 and the needle valve 70 will in turn set up a sonic wave within the evaporating unit 14. A slight adjustment in the length of the pipe constituting the evaporator unit may be made in any desired manner, including the adjustment of the pipe 20 in the casing of the expansion valve 10, or by adjusting the position of the piston head 62 through adjustment of the spider 68. In any event, it is possible by properly proportioning the relative lengths of conduits constituting the evaporator unit 14 and the condenser unit 16, and by controlling the frequency and stroke of the piston 32, to produce a standing wave in either or both of these units.

It is especially desirable that the standing wave produced in the evaporation unit shall have its peak pressure at the ports 52, 54 so timed as to occur when the piston is on its outstroke and the valve 40 is open whereby the vapor will more readily be inducted into the rarefied zone adjacent the piston head.

*Embodiment of FIGURE 4*

It is well known that sonic waves may be reflected and focused to a central point of intensity. Use is made of these two known facts, in order to focus and conduct a periodic sonic wave through a capillary orifice and into the evaporator to thereby establish and maintain a sonic standing wave therein. Such an arrangement is shown in FIGURE 4 where in place of the expansion valve 10 there is shown an equivalent therefor.

Thus, in place of the casing of the expansion valve 10 there is provided a casing 90 whose right hand end communicates with the pipe 20, not shown, and its left hand end is provided with a closure wall 92 provided with a capillary type of orifice 94 thereinto. The conduit 28 connecting the condenser unit with the expansion valve assembly terminates in an extremity 96 whose walls inwardly converge at such a curvature that they constitute a parabolic or focusing surface whose terminus converges to and communicates with the capillary orifice 94. This orifice 94 constitutes the focus of the reflecting surfaces of the extremity 96 whereby the sonic wave generated within the condenser unit as previously mentioned is caused to focus at and thus communicate with the interior of the casing 90 through the orifice 94. At this focus, there is thus produced a standing wave in the evaporator unit.

It is considered that the expansion unit of FIGURE 4 functions in exactly the same manner as the expansion valve assembly 10 of FIGURE 1.

Figure 5:
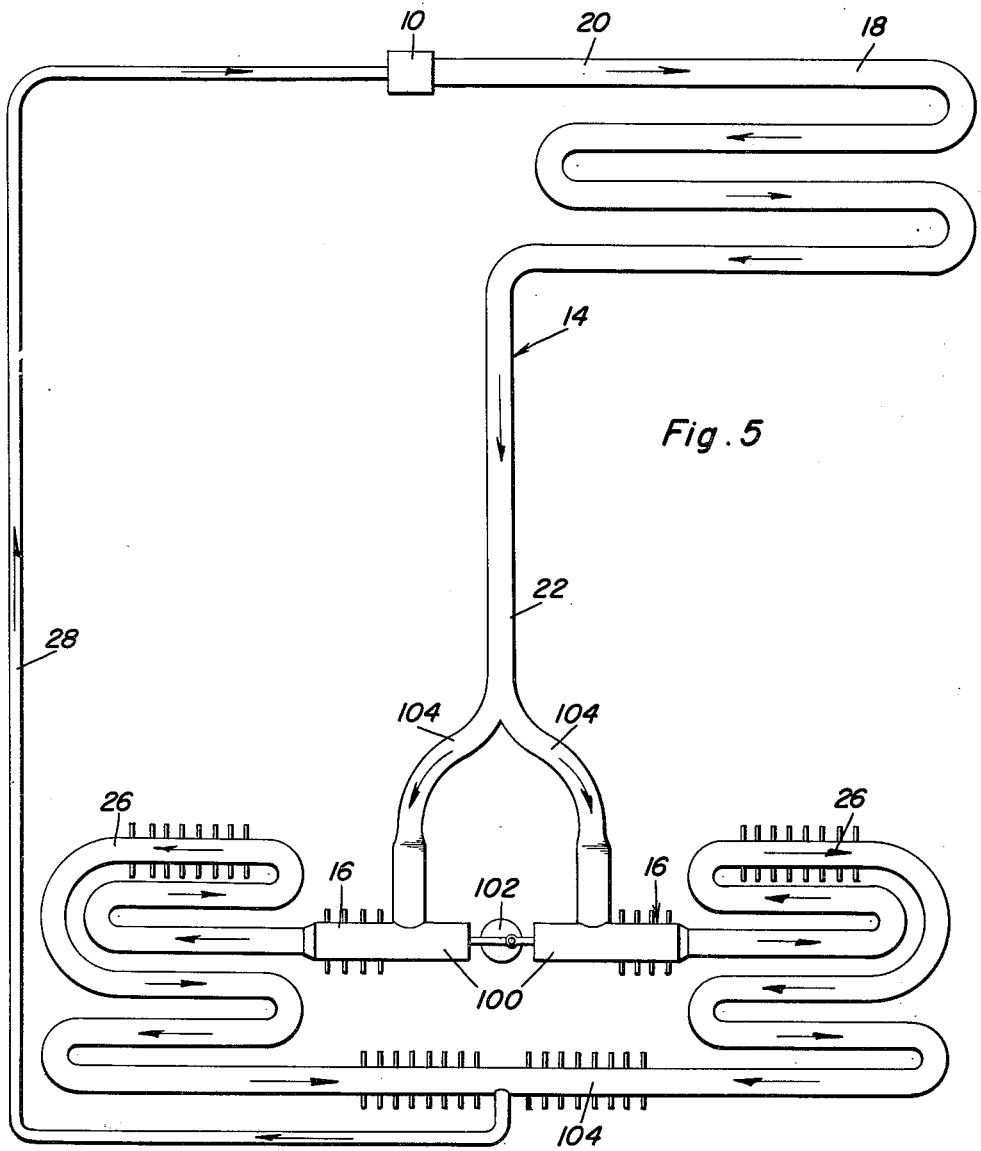
FIGURE 5 is a diagrammatic view showing a modified application of the principles of this invention to a refrigerating system of the circulatory type.

*Embodiment of FIGURE 5*

A somewhat modified method and apparatus in accordance with this invention is disclosed in FIGURE 5, in which the same numerals designate the same parts employed in connection with the embodiment of FIGURES 1-3.

As in the preceding embodiment, the expansion valve assembly is indicated by the numeral 10, while a pair of circulating pumps, each indicated by the numeral 100, and which are connected to a driving crankshaft 102 at a phase angle of 180°, are provided. A condenser unit 16 is connected to each of the pumps 100 while a single evaporator unit 14 is connected between the expansion valve assembly 10 and the pair of circulating pumps 100.

The evaporator unit includes the evaporating coil 18, as previously mentioned, and this coil is connected to the discharge side of the expansion valve 10 as by a conduit 20, while the conduit 22 connecting the evaporator coil 18 to the intake side of the circulating pumps 100 is provided with branched conduits 104, each connected to the intake side of one of the pumps.

Each condenser unit 16 includes a condenser coil 26 and these condenser coils have their discharge ends connected to each other as by a conduit 106 which is in free communication with the conduit 28 by means of which the condensing coils are connected to the intake side of the expansion valve 10.

As shown by the arrows in FIGURE 5, a uni-directional circulation of refrigerant is obtained, the vapor from the evaporator chamber being distributed by the branched conduits 104 to the pair of circulating pumps 100, and from thence through the pair of condenser coils 26 and by means of the conduit 106 to the liquid condensate return conduit 28 which delivers the condensed refrigerant to the expansion valve 10.

In this form of the invention it will be observed that the sonic waves produced by the pumps 100, each of these pumps being preferably identical with the pump disclosed in FIGURE 2, are 180° out of phase, and thus will cancel or neutralize each other in the conduit 106. Consequently, the standing waves produced by the two pump-generators, are cancelled in the conduit 104 before the refrigerant is discharged into the conduit 28. This cancellation of the energy carrying sonic waves results in the creation of pressure and heat. This heat is removed from the condenser through the surrounding cooling medium, thereby assisting in cooling the refrigerant to such an extent that the conduit 28 will be filled with the refrigerant in its liquid phase. In this system, therefore, the generation of the sonic wave is confined to the conduit section extending from the pumps 100 to that portion of the conduit 106 where the two waves, which are 180° out of phase with respect to each other, are neutralized and cancelled.

In this form of the invention, the production of a standing wave may be confined to the condenser unit and will not be communicated to the evaporator unit. Alternatively, however, additional wave generating means may be provided for the evaporator unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A method of refrigeration in a system having an evaporator, a condenser, and a pump operatively connected therewith for circulating the refrigerant in said system comprising: transferring refrigerant in its vapor phase by said pump from the evaporator to the condenser in order to convert it from its vapor to its liquid phase, said liquid phase forming a column substantially filling said condenser, simultaneously inducing a periodic compressive impulse into said column whereby to compress said refrigerant and to produce and maintain a standing sonic wave in the liquid column and thereby to increase the pressure peaks within the liquid in said column, said compressive impulse being of a velocity sufficient to effect a periodically induced rarefied area in said liquid column of a pressure sufficiently low to induce the introduction of vapor from said evaporator to be absorbed by said liquid after reversal of said periodic compressive impulse immediately upon the instance of the next periodic compressive impulse, simultaneously withdrawing heat from the condenser, moving the refrigerant in its liquid phase from the condenser to the evaporator, and permitting the refrigerant to expand from its liquid to its vapor phase in the evaporator.

2. The method of claim 1 wherein the step of moving the liquid from the condenser into the evaporator is periodically effected during the rarefaction phase of the sonic standing wave, whereby to increase pressure peaks within the liquid refrigerant in said column.

3. The method of claim 1 wherein the circulation of the refrigerant is uni-directional.

4. The method of claim 1 wherein the pump is employed to create the compressive impulse.

5. The method of claim 2 wherein the sonic standing wave is created by the periodic eduction of liquid from the condenser into the evaporator.

6. The method of claim 2 wherein the pump is employed to create the compressive impulse.

7. A method of refrigeration in a system having an evaporator, a condenser, a pump operatively connected therewith for circulating the refrigerant in said system and an expansion valve operatively interposed between said pump and said evaporator, comprising: transferring refrigerant by said pump from said evaporator to said condenser in order to convert it from its vapor phase to its liquid phase, and simultaneously through said valve transferring refrigerant from said condenser to said evaporator, said liquid phase forming a column substantially filling said condenser, inducing an intermittent rarefying and compressive impulse into said column whereby said valve creates and maintains a sonic standing wave in said condenser, said intermittent impulse being of a velocity sufficient to effect a periodically induced rarefied area in said liquid column of a pressure sufficiently low to induce the introduction of vapor from said evaporator to be absorbed by said liquid after reversal of said intermittent impulse from its compressive to its rarefying phase immediately upon the instance of the next compressive phase, simultaneously withdrawing heat from the condenser, moving said refrigerant in its liquid phase from the condenser to the evaporator and permitting the refrigerant to expand from its liquid to its vapor phase in the evaporator.

8. The method of claim 7 wherein the expansion valve is vibrated by the pump to thereby produce said sonic wave.

9. The method of claim 7 wherein a sonic standing wave is introduced into said evaporator by said valve simultaneously with the introduction of said sonic standing wave into said condenser.

10. The method of claim 7 wherein said pump induces said intermittent rarefying and compressive impulse.

11. The method of claim 9 including the step of operating said pump simultaneously to circulate said refrigerant and produce a sonic standing wave in said condenser and by operation of said pump, vibrating said expansion valve to produce said sonic standing wave in said evaporator.

12. The method of claim 10 wherein the step of moving the liquid from the condenser into the evaporator is periodically effected during the rarefaction phase of the sonic standing wave, whereby to increase pressure peaks within the liquid refrigerant in said column.

13. In a refrigerating system comprising an evaporator, at least two condensers and a pump for each condenser, for circulating refrigerant therein, the method of augmenting heat transfer in said system comprising transferring refrigerant from said evaporator to each said condenser by its associated pump whereby to convert said refrigerant from its vapor to its liquid phase, said liquid phase forming a column substantially filling each said condenser, inducing a periodic compressive impulse into each column whereby to produce and maintain a sonic standing wave in the liquid column and thereby to increase the pressure peaks within the liquid refrigerant in the column, said compressive impulse being of a velocity sufficient to effect a periodically induced rarefied area in each liquid column of a pressure sufficiently low to induce the introduction of vapor from said evaporator to be absorbed by said liquid after reversal of the periodic compressive impulse immediately upon the instance of the next periodic compressive impulse, the sonic standing waves in each condenser being out of phase to an extent so that their combination will produce substantial cancellation thereof, combining said out of phase sonic standing waves to produce such cancellation thus producing heat and pressure in the refrigerant of the condensers, and removing heat from said condensers.

14. The method of claim 13 including the step of producing at least one of said sonic waves by one of said pumps.

15. The method of claim 13 including the step of producing said sonic waves by said pump.

16. The method of claim 13 wherein two condensers only are provided and the sonic standing waves are 180° out of phase.

References Cited in the file of this patent

UNITED STATES PATENTS

| | | |
|---|---|---|
| 449,181 | Schneider | Mar. 31, 1891 |
| 1,730,336 | Bellocq | Oct. 1, 1929 |
| 1,780,335 | Canton | Nov. 4, 1930 |
| 2,266,069 | Phillips | Dec. 16, 1941 |
| 2,452,441 | Dube | Oct. 26, 1948 |
| 2,463,892 | Martin | Mar. 8, 1949 |
| 2,595,968 | McCoy | May 6, 1952 |
| 2,668,424 | Mueller | Feb. 9, 1954 |
| 2,679,732 | Dolz | June 1, 1954 |
| 2,686,407 | Zellner | Aug. 17, 1954 |